(12) United States Patent
Moake

(10) Patent No.: US 10,429,544 B2
(45) Date of Patent: Oct. 1, 2019

(54) GAIN STABILIZATION OF A NATURAL GAMMA RAY TOOL

(71) Applicant: Halliburton Energy Services, Inc., Houston, TX (US)

(72) Inventor: Gordon L. Moake, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 245 days.

(21) Appl. No.: 15/510,456

(22) PCT Filed: Oct. 3, 2014

(86) PCT No.: PCT/US2014/059030
§ 371 (c)(1),
(2) Date: Mar. 10, 2017

(87) PCT Pub. No.: WO2016/053350
PCT Pub. Date: Apr. 7, 2016

(65) Prior Publication Data
US 2017/0248737 A1 Aug. 31, 2017

(51) Int. Cl.
*G01V 13/00* (2006.01)
*E21B 49/00* (2006.01)
(Continued)

(52) U.S. Cl.
CPC .............. *G01V 13/00* (2013.01); *E21B 47/00* (2013.01); *E21B 49/00* (2013.01); *G01T 1/40* (2013.01);
(Continued)

(58) Field of Classification Search
CPC . G01V 13/00; G01V 5/06; G01V 5/12; G01T 1/40; E21B 47/00; E21B 47/1015; E21B 49/00
See application file for complete search history.

(56) References Cited

U.S. PATENT DOCUMENTS 6,369,381 B1    4/2002  Troxler et al.
2005/0199794 A1*  9/2005  Mickael ................ G01V 5/06
                                                        250/261
(Continued)

FOREIGN PATENT DOCUMENTS

CA       2742840         5/2010
WO    2016053350 A1    4/2016

OTHER PUBLICATIONS

"International Application Serial No. PCT/US2014/059030, International Search Report dated Jun. 29, 2015", 4 pgs.
(Continued)

*Primary Examiner* — Manuel L Barbee
(74) *Attorney, Agent, or Firm* — Gilliam IP PLLC

(57) ABSTRACT

In some embodiments, an apparatus and a system, as well as a method and an article, may operate to receive gamma ray measurements from a gamma ray detector; to generate a spectrum based on the gamma ray measurements, the spectrum including a plurality of channels and count rates for the plurality of channels, wherein a channel number of a channel corresponds to energy values of the received gamma rays; to fit a curve to a portion of the spectrum; to determine a location of the maximum of the first derivative of the curve; and to adjust a gain of the gamma ray detector based on the location of the maximum of the first derivative of the curve. Additional apparatus, systems, and methods are disclosed.

19 Claims, 8 Drawing Sheets

(51) Int. Cl.
*G01T 1/40* (2006.01)
*G01V 5/06* (2006.01)
*G01V 5/12* (2006.01)
*E21B 47/00* (2012.01)
*E21B 47/10* (2012.01)

(52) U.S. Cl.
CPC .................. *G01V 5/06* (2013.01); *G01V 5/12* (2013.01); *E21B 47/1015* (2013.01)

(56) References Cited

U.S. PATENT DOCUMENTS

2007/0284518 A1* 12/2007 Randall .................. G01T 7/005
250/261
2008/0265151 A1 10/2008 Gadot
2010/0116978 A1 5/2010 Stoller et al.

OTHER PUBLICATIONS

"International Application Serial No. PCT/US2014/059030, Written Opinion dated Jun. 29, 2015", 7 pgs.
Canadian Application Serial No. 2,960,028, Canadian Office Action; dated Apr. 17, 2018, 6 pages.
"Australian Application Serial No. 2014407474; First Examination Report dated Oct. 23, 2017", 3 pages.
CA Application Serial No. 2,960,028, Examiner's Requisition, dated Dec. 27, 2018, 3 pages.

\* cited by examiner

GAIN STABILIZATION OF A NATURAL GAMMA RAY TOOL

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole. To obtain such measurements, gamma ray detectors are often used to measure naturally-occurring gamma radiation downhole. However, the gain of some gamma ray detectors may fluctuate due to environmental conditions downhole. These fluctuations can cause changes in the apparent energy level detected by the gamma ray detector, thereby leading to inaccuracies in the measurements reported by gamma ray measurement tools.

DETAILED DESCRIPTION

To address some of the challenges described above, as well as others, systems, apparatus, and methods are described herein for stabilizing net gain of gamma ray detectors.

Figure 1:
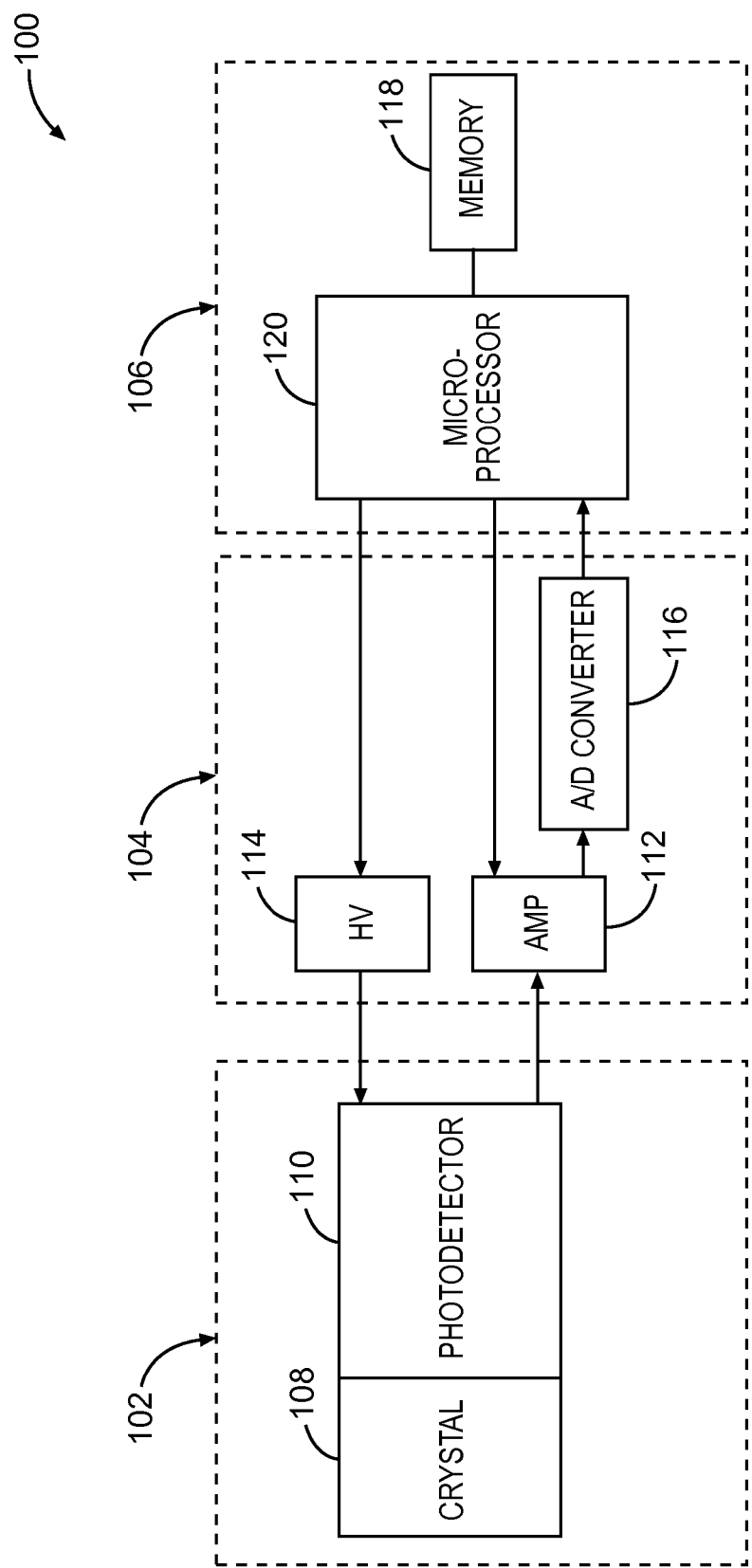
FIG. 1 is a schematic diagram of a gamma ray measurement tool in accordance with some embodiments.

FIG. 1 is a schematic diagram of a gamma ray measurement tool 100 in accordance with some embodiments. The gamma ray measurement tool 100 includes a downhole gamma ray detector 102, electronics unit 104, and a processing unit 106. The gamma ray detector 102 may be part of a drilling assembly, for logging while drilling (LWD), or measuring while drilling (MWD) operations, or may be a wireline tool for logging an existing well as described later herein with reference to FIGS. 7 and 8. The gamma ray measurement tool 100 can include a plurality of azimuthal gamma ray detectors. Each gamma ray detector 102 counts gamma ray energy emitted naturally subsurface, but could also be used for other sources of gamma rays in the wellbore. The azimuthal gamma ray detectors may be near an exterior of a logging tool and be spaced about a circumference of the logging tool. While a plurality of gamma ray detectors may be included, only one is explicitly presented here.

The gamma ray detector 102 provides signals that scale with the energy deposited by the gamma rays in the gamma ray detector 102. The gamma ray detector 102 includes one or more scintillator crystals 108 for receiving the gamma rays that then create light emissions that influence an adjacent, optically-coupled photodetector 110, e.g., a photomultiplier tube. The gamma ray detector 102 is electrically coupled to an electronics unit 104. The electronics unit 104 may include an amplifier 112, a variable high voltage supply unit 114, and an analog-to-digital (A/D) converter 116. The high voltage supply unit 114 is coupled to and powers one or more of the gamma ray detectors 102. One high voltage supply unit 114 may be used to power multiple gamma ray detectors. The high voltage supply unit 114 may be configured so that the output voltage can be adjusted by an external controller or processing unit 106.

The electronics unit 104 also includes one or more amplifiers 112 to modify the amplitude of the signals coming from the one or more gamma ray detectors 102. The amplifier 112 may be configured to be adjusted by the processing unit 106. The electronics unit 104 further includes the analog-to-digital (A/D) converter 116 to convert voltage signals to digital signals to be passed to the processing unit 106. The electronics unit 104 converts and processes the signals by, for example, adjusting the signal amplitude or adjusting the voltage supplied to the gamma ray detector 102.

The processing unit 106 includes memory 118 associated with one or more processors 120. Memory 118 when coupled with the processor 120 can execute code to accomplish functionalities including the methods for gain control described later herein. Memory 118 can store measurements of formation parameters or parameters of the gamma ray measurement tool 100 such as gain parameters, calibration constants, identification data, etc. The memory 118 therefore may include a database, for example a relational database. The processor 120 can control the output voltage of the high voltage supply unit 114 or amplifier 112. The gamma ray measurement tool 100 can also include a battery or other power source (not shown in FIG. 1).

The electronics unit 104 and processing unit 106 are operable, inter alia, to sort the digital signals from the downhole gamma ray detector 102 into channels according to the amplitude of the digital signals and store the channels as a gamma spectrum. The gamma ray measurement tool 100 can be a gross counting gamma ray detector, wherein the process of determining the gross count involves developing counts over a plurality of channels arranged in a spectrum. Whether accomplished in logging while drilling (FIG. 8) or on a wireline (FIG. 7), the gamma ray measurement tool 100 develops count data over n-channels. Each channel represents a range of energy levels, wherein the energy levels can be measured in units such as kilo electron volts (keV). The number of channels may vary for different applications; for example, n may be 10, 16, 20, 50, 64, 100, 128, 150, 200, 256, 400 or more, or any number in between.

In various embodiments, the processing unit 106 receives an energy spectrum from the emitted gamma radiation and records the spectrum across a spectrum of n channels (where n equals the number of channels), and the processing unit 106 determines the total count above a threshold. The processing unit 106 sets the threshold to be at least greater than a noise level but low enough to measure all of the gamma rays that enter the gamma ray detector 102. Initially, the processing unit 106 may set the threshold based on, for example, an actual or predicted noise level, historical data, etc.

The gain of the gamma ray detector 102 varies at times with certain variables, e.g., temperature, equipment limitations, high voltage of the photomultiplier in the gamma ray detector 102, etc. These variations will affect the counts stored in the various channels. To obtain a gross count that is not affected by these variations, the processing unit 106 stabilizes the system gain of each gamma ray detector 102 of a gamma ray measurement tool 100 independently.

The system gain can be adjusted in one of several ways. The adjustment can be carried out by adjusting the hardware gain. Alternatively, the spectrum can be scaled in memory. In addition, the thresholds used to compute count ranges in an energy window can be adjusted.

A controller such as the processing unit 106 can adjust the gain of each gamma ray detector 102 by adjusting the output of the high voltage supply unit 114, the gain of the amplifier 112, or by adjusting both the output of the high voltage supply unit 114 and the gain of the amplifier 112. In this way, a stabilized gross count may be obtained by summing counts in the same channels. The processing unit 106 can assemble spectra for a period of time and then analyze the spectra to determine the amount by which the gain is to be adjusted, if any.

The processing unit 106 may perform gain adjustment after the spectra contain a minimum amount of counts. Alternatively, or in addition, the processing unit 106 may implement algorithms to determine gain adjustment periodically, or after a minimum period of time has passed with the accumulated counts in each gamma ray detector 102 exceeding a minimum number of counts. The intervals between gain adjustments may vary as the magnitudes of the counts stored in the spectra vary. The time between adjustments should be sufficiently long so that the processing unit 106 can make a statistically significant adjustment, yet short enough so that the gamma ray detector 102 can respond to gain variations. In some embodiments, the processing unit 106 may perform gain adjustment based on received diagnostics information for the gamma ray measurement tool 100. Diagnostics information can include indicators, such as a flag, for indicating whether the gamma ray detector(s) 102 have excessive high or low-energy noise, for example.

Figure 2:
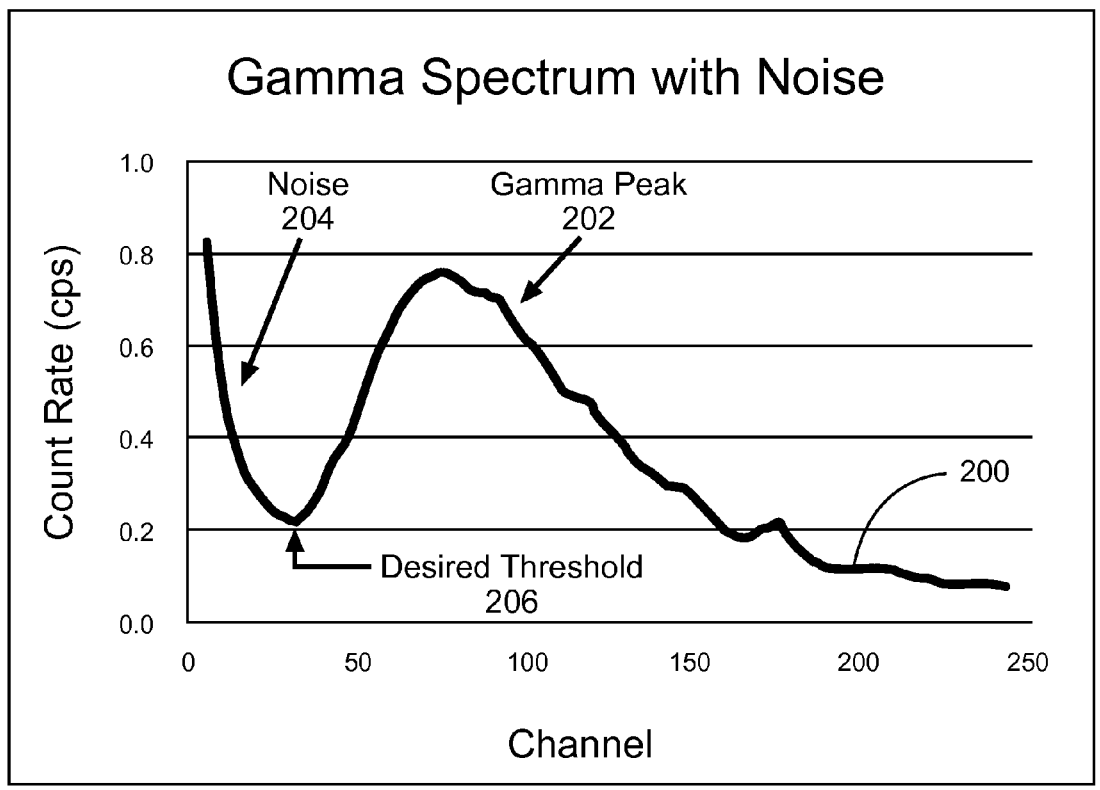
FIG. 2 is an example gamma spectrum such as can be generated based on values provided by a gamma ray measurement tool in accordance with some embodiments.

FIG. 2 is an example gamma spectrum 200 such as can be generated based on values provided by a gamma ray measurement tool 100 in accordance with some embodiments. In the illustrate example of FIG. 2, each channel in the x-axis represents 2 keV, and the count rates measured in each channel are plotted on the y-axis. The gamma spectrum 200 includes a maximum 202 or gamma peak, and a noise portion or segment 204. The desired threshold 206 is set above the maximum noise level, yet low enough so that as many gamma rays as possible will be detected. Assuming that gamma spectrum 200 was obtained at a desired nominal system gain and that the noise is the maximum expected, then a choice for threshold 206 may be at about channel 28.

According to embodiments, an identifiable, stable point of the gamma spectrum 200 is desired for use as a reference for adjusting the gain, threshold, or hardware. In embodiments, the location of a maximum value of the first derivative of a curve defining the gamma spectrum 200 with respect to channel number can be used as this identifiable, stable point, because the maximum of the first derivative is located on the rising edge of the peak of the raw data set, and may be insensitive to variations in density of the formation being measured. For example, the threshold may be set at half the channel number of the location of the maximum of this first derivative.

Some systems compute the first derivative of the gamma spectrum 200 at a point based on channels above and below each computation point. This computation is often done at many points in the gamma spectrum 200 in order to determine the location of the maximum value. However, statistical uncertainties in the gamma spectrum 200 can result in an uncertainty in the computed location of the maximum of the first derivative. Statistical uncertainties can be reduced or eliminated by summing the spectra over longer periods of time, but this can result in slow response of gain stabilization, in particular when the gamma ray measurement tool 100 first is powered on. Embodiments reduce or eliminate the effect of statistical fluctuations.

In accordance with some embodiments, the processing unit 106 can determine whether the gain of each gamma ray detector 102 is close to a nominal value. In some examples, the processing unit 106 can determine this by computing a centroid of the spectrum 200 and then checking to see if the centroid is within a certain threshold distance (e.g., within 10-15%) of a nominal value. If the gain is not close, the processing unit 106 can perform a gross adjustment of the system gain based on the centroid of the gamma spectrum 200. Otherwise, the processing unit 106 can perform a fine adjustment of the system gain based on the location of the maximum of the first derivative of a portion of the gamma spectrum 200.

In cases where system gain is to be adjusted based on the centroid, the processing unit 106 adjusts the gain of the each gamma ray detector 102 to put the centroid at the nominal location for the centroid. The nominal location for the centroid can be set when the gamma ray measurement tool 100 and gamma ray detector(s) 102 are first characterized or initialized. For example, the nominal locations may be chosen as channel 90 of a 256-channel spectrum, where the typical centroid range is 50 to 150. Processing time for these centroid computations can be relatively quick, and the statistical uncertainties are small. Methods according to at least these embodiments produce accurate estimates for gain adjustment because the spectral shape of detected gamma rays does not vary significantly with the formation properties or the radioactive isotopes that generate the gamma rays. Because curve shapes for natural-gamma-ray spectra are very similar, gain adjustment calculations based on centroids can be relatively accurate regardless of the formation properties or percentage or identity of radioactive isotopes therein.

Figure 3:
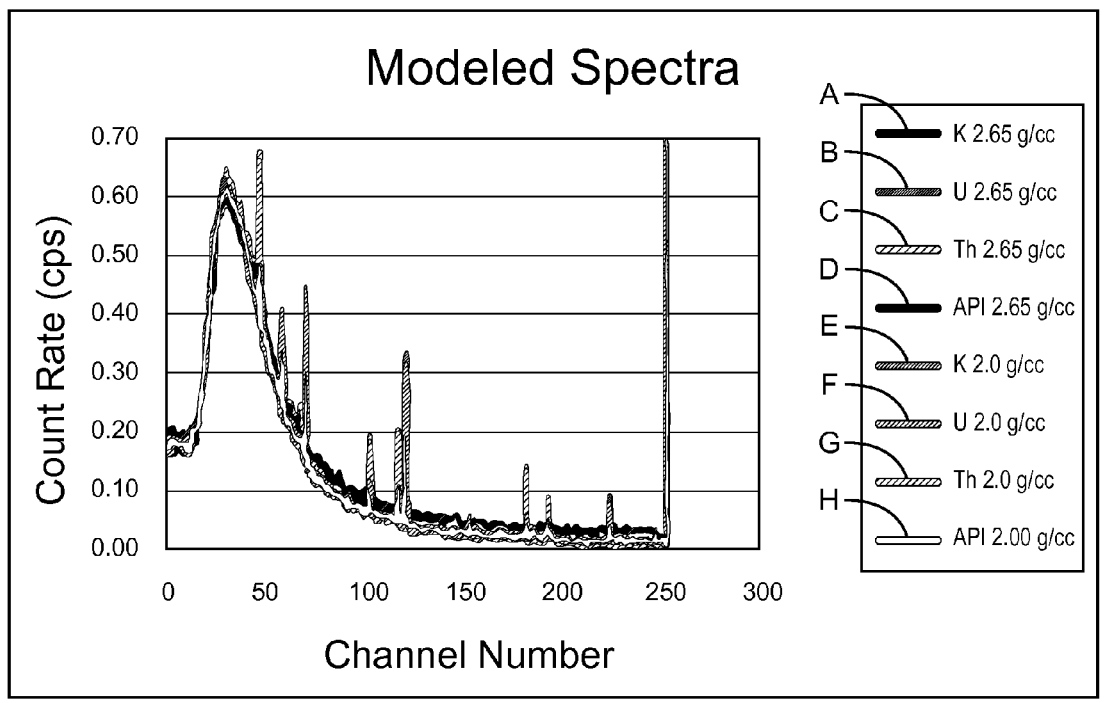
FIG. 3 is an example of modeled spectra for various radioactive isotopes.

FIG. 3 is an example of modeled spectra for various radioactive isotopes. It can be appreciated upon examining FIG. 3 that the spectral shapes do not vary significantly. The curves of FIG. 3 represent the count rate observed in each channel, and each channel represents 5 keV. The amplitude of the curves have been scaled for purposes of demonstrating that the curves have the same shape. In FIG. 3, counts that would normally appear in channels above 254 are added to those that naturally occur in channel 254. The spectra A-H represent the cases where the natural gamma radiation in the formations is all potassium (spectra A and E), all uranium (spectra B and F), all thorium (spectra C and G), or a mixture of the three in the proportions found in an American Petroleum Institute (API) test formation (spectra D and H). Spectra for two different formation densities are shown.

The processing unit 106 can generate a centroid for the spectrum according to:

$$\text{Centroid} = \frac{\sum_{i=lowerchannel}^{upperchannel} i \cdot \text{spectrum}(i)}{\sum_{i=lowerchannel}^{upperchannel} \text{spectrum}(i)} \quad (1)$$

where spectrum(i) is the count rate measured in channel i.

Figure 4:
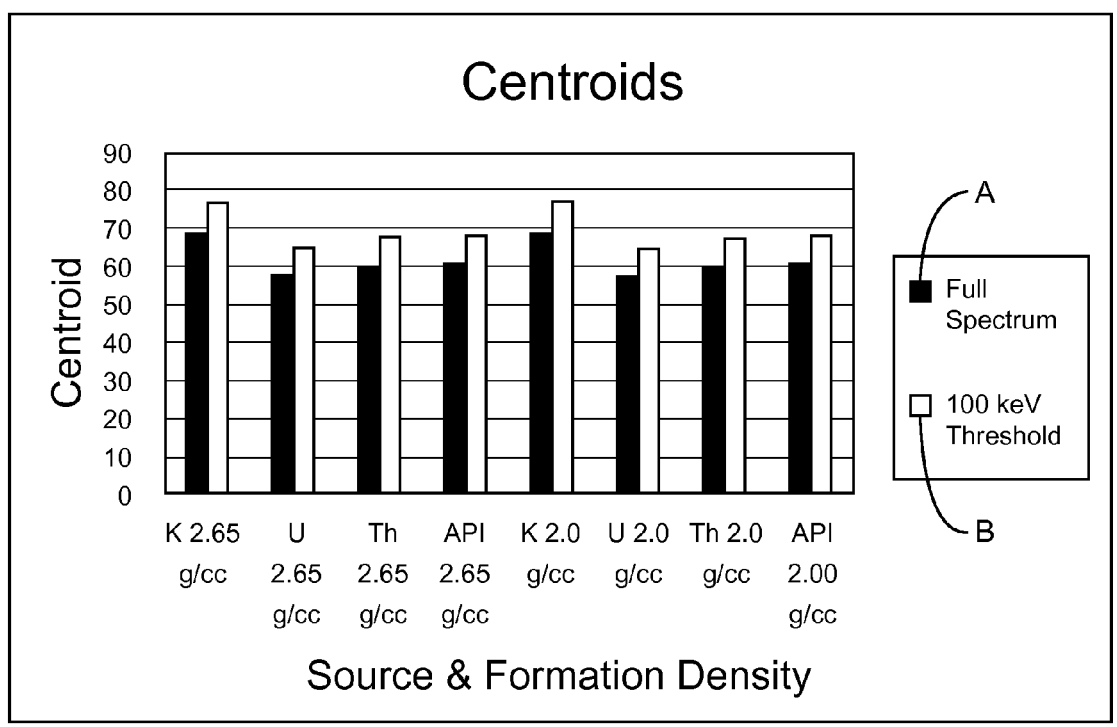
FIG. 4 is an example of centroids calculated from modeled spectra of FIG. 3 in accordance with some embodiments.

FIG. 4 is an example of centroids calculated from modeled spectra of FIG. 3 in accordance with some embodiments. The centroids can be calculated by, for example, the processing unit 106 or by a surface system as described with reference to FIGS. 6 and 7 later herein.

FIG. 4 illustrates two cases: a "Full Spectrum" case A that uses all the data, and a "100 keV Threshold" case B that uses only the data above 100 keV. The variations in centroid values are essentially the same for the two. For example, it can be demonstrated on inspection of FIG. 4 that the centroids are all within 9% of channel 63.4 for case A and within 9% of 70.8 for case B.

In most situations, it can be accurately predicted that noise will manifest itself as an increase in counts in the low-energy subset of the spectrum, as can be seen upon examination of FIG. 2. Accordingly, noise will typically only distort the centroid computed using the full spectrum, while noise will have little or no effect on the centroid computed from the data above 100 keV (case A in FIG. 4). Consequently, the processing unit 106 will use the centroid computed from a first subset of the data, for example the data above 100 keV, (e.g., the data excludes the low-energy subset of the spectrum) in the stabilization algorithm. In some embodiments, if the gain change is greater than a predefined number, for example, if the gain change is greater than 20% of the original gain, the processing unit 106 may recompute the gain change using a second, larger subset of the data.

As mentioned earlier herein, if substantial gain adjustments are not necessary, the processing unit 106 can fine-tune the system gain based on the first derivative of the gamma spectrum 200. To find the first derivative, in at some embodiments, the processing unit 106 will fit a curve to a portion that includes a range of data points of the gamma spectrum 200, where the processing unit 106 selects the range of channels that includes the expected or desired location of the maximum of the first derivative of the gamma spectrum 200. This range of data can be set by the processing unit 106 to be within a tolerance set based on the centroid test described earlier herein, which can help assure that the location of the maximum of the first derivative will be within the range that the processing unit 106 fits to the cubic equation. In some examples, the processing unit 106 can select a range centered on a reference channel (e.g., channel 50), with a multipliers being used to calculate the lower limit of the range and an upper limit of the range based on the reference channel.

The processing unit 106 can obtain the location of the maximum of the first derivative from the curve parameters obtained in the fit. In some example embodiments, the processing unit 106 can fit a cubic polynomial, expressed with respect to channel number, to the data. The cubic polynomial can be represented by:

$$y = c_0 + c_1 x + c_2 x^2 + c_3 x^3 \quad (2)$$

where $c_0$, $c_1$, $c_2$, and $c_3$ are the coefficients of the polynomial.

However, embodiments are not limited thereto, and the processing unit 106 can use other equations such as, for example, a fourth-order polynomial. It will be understood by those of ordinary skill in the art that the location of an extreme value $x_{extreme}$ of the first derivative of Equation (2) is located at:

$$x_{extreme} = \frac{-c_2}{3c_3} \quad (3)$$

Assuming that care is taken to ensure that the correct portion of the gamma spectrum 200 is being fit, then the extreme value $x_{extreme}$ will be the maximum of the first derivative and not the minimum.

This method when implemented in accordance with embodiments allows a large region of the spectrum to be scanned at once, while reducing or eliminating statistical fluctuations. The processing unit 106 may use a cubic equation for the curve fitting because a cubic equation can describe a large portion of the gamma spectrum 200, while still not using significant computational power to find the first derivative. Furthermore, processing units 106 may use cubic equations for the curve fitting because cubic equations have a unique location of the maximum value of the first derivative, which simplifies the process of selecting this location for use in setting the gain of the gamma ray detector 102. The statistical uncertainty related to the actual location of the maximum of the first derivative of the curve will be reduced as the number of points to which the processing unit 106 fits the curve is increased. In the case of a cubic polynomial, statistical uncertainty in the location of the maximum of the first derivative is reduced as the number of points used exceeds four, because four points is the minimum number required to compute cubic parameters.

Table 1 is example pseudocode for computing a gain change based on the maximum of the first derivative of Equation (2). However, it will be understood that embodiments are not limited to any particular implementation for finding this maximum and the algorithm can include other operations such as error checking, range checking, etc.

TABLE 1 pseudocode for computing gain change.

1: $a(1,1) = \text{fit\_upper\_channel} - \text{fit\_lower\_channel} + 1$

2: $a(1,2) = \sum_{i=\text{fit\_lower\_channel}}^{\text{fit\_upper\_channel}} i$ 3: $a(1,3) = \sum_{i=\text{fit\_lower\_channel}}^{\text{fit\_upper\_channel}} i^2$ 4: $a(1,4) = \sum_{i=\text{fit\_lower\_channel}}^{\text{fit\_upper\_channel}} i^3$ 5: $a(2,4) = \sum_{i=\text{fit\_lower\_channel}}^{\text{fit\_upper\_channel}} i^4$ 6: $a(3,4) = \sum_{i=\text{fit\_lower\_channel}}^{\text{fit\_upper\_channel}} i^5$ 7: $a(4,4) = \sum_{i=\text{fit\_lower\_channel}}^{\text{fit\_upper\_channel}} i^6$ 8: $a(2,2) = a(1,3)$
9: $a(2,3) = a(1,4)$
10: $a(3,3) = a(2,4)$
11: $a(2,1) = a(1,2)$
12: $a(3,1) = a(1,3)$
13: $a(3,2) = a(2,3)$
14: $a(4,1) = a(1,4)$
15: $a(4,2) = a(2,4)$
16: $a(4,3) = a(3,4)$ TABLE 1-continued pseudocode for computing gain change.

17:
$$b(1) = \sum_{i=fit\_lower\_channel}^{fit\_upper\_channel} spectrum(i + derivative\_location\_nom)$$

18:
$$b(2) = \sum_{i=fit\_lower\_channel}^{fit\_upper\_channel} i \cdot spectrum(i\_derivative\_location\_nom)$$

19:
$$b(3) = \sum_{i=fit\_lower\_channel}^{fit\_upper\_channel} i^2 \cdot spectrum(i + derivative\_location\_nom)$$

20:
$$b(4) = \sum_{i=fit\_lower\_channel}^{fit\_upper\_channel} i^3 \cdot spectrum(i + derivative\_location\_nom)$$

21: det4=determinant(b, 4)
22: det3=determinant(b, 3)
23: maximum=−det3/(3*det4)
24: limit the computed maximum to be within a range
25: gain_change_compute=ref_channel/(maximum + ref_channel)

In lines 1-20, the processing unit 106 computes the coefficients of the matrix equation ax=b that defines the parameters of a cubic equation that fits the input spectrum between fit_lower_channel and fit_upper_channel, where x is a vector that represents the four coefficients of the cubic equation and derivative_location_nom is the nominal location of the maximum derivative. Referencing position to the nominal location of the maximum derivative lowers the precision to which the calculations must be performed.

In lines 21-22, the processing unit 106 computes two of the determinants that can be used to solve the equation for the four coefficients, wherein determinant (b,j) represents the determinant of a modified matrix a, where the modification is performed by replacing the $j^{th}$ column of a with the vector b. In line 23, the processing unit 106 finds the location of the maximum of the first derivative of the cubic equation defined by the matrix equation ax=b with matrix coefficients specified in lines 1-20, wherein the location is referenced to the nominal location of the maximum derivative. This method allows the location of the maximum of the first derivative to be computed without fully computing the coefficients of the cubic equation, since the value computed in line 23 is mathematically equivalent to the value of the location of the extreme given in Equation (3). In line 24, the processing unit 106 limits the maximum of the first derivative to a location within a predetermined range, relative to the reference channel for example or based on centroids as described earlier herein.

In line 25, the processing unit 106 computes the gain change based on the maximum. In some examples, the processing unit 106 may provide larger gain adjustments upon powering up the gamma ray measurement tool 100 than would have been provided after the gamma ray measurement tool 100 has been operating for longer periods of time.

Figure 5:
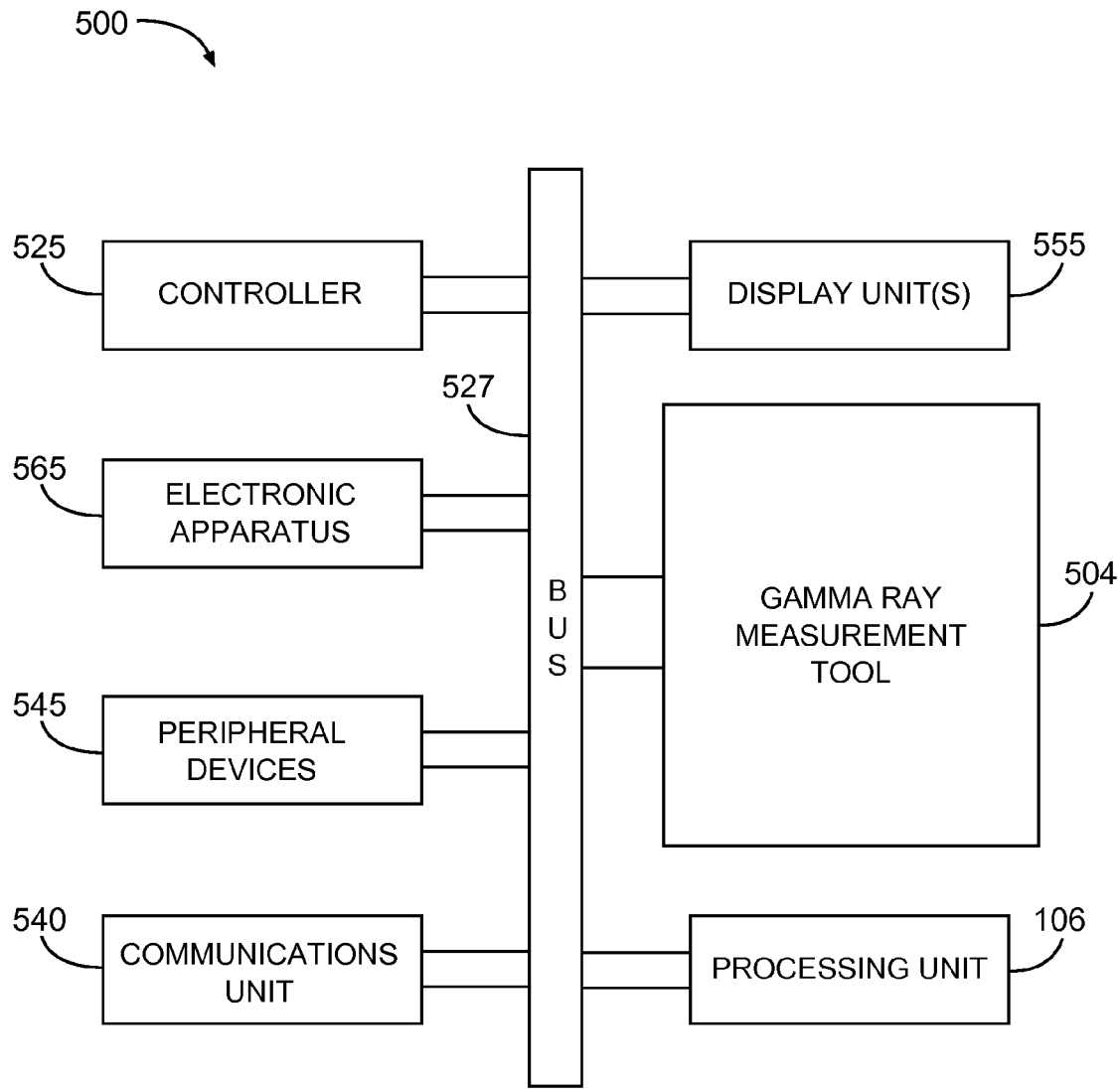
FIG. 5 is a block diagram of a logging system according to some embodiments.

FIG. 5 is a block diagram of a logging system 500 according to various embodiments. The logging system 500 can receive count measurements or other data from the gamma ray measurement tool 100 (FIG. 1) and provide gain stabilization for one or more gamma ray detectors 102 of the gamma ray measurement tool 100. The logging system 500 includes gamma ray measurement tool 504 operable in a wellbore.

The processing unit 106 can couple to the gamma ray measurement tool 504 to obtain measurements from the gamma ray measurement tool 504 as described earlier herein regarding FIG. 1. The processing unit 106 can perform gain stabilization on the gamma ray measurement tool 504 as described herein. In some embodiments, a logging system 500 comprises one or more of the gamma ray measurement tool 504, as well as a housing (not shown in FIG. 5) that can house the gamma ray measurement tool 504 or other electronics. The housing might take the form of a wireline tool body, or a downhole tool as described in more detail below with reference to FIGS. 7 and 8. The processing unit 106 may be part of a surface workstation or the processing unit 106 can be packaged with the gamma ray measurement tool 504 as described earlier herein regarding FIG. 1 or attached to the housing.

The logging system 500 can additionally include a controller 525, an electronic apparatus 565, and a communications unit 540. The controller 525 and the processing unit 106 can be fabricated to operate the gamma ray measurement tool 504 to acquire measurement data such as counts as the gamma ray measurement tool 504 is operated.

Electronic apparatus 565 can be used in conjunction with the controller 525 to perform tasks associated with taking measurements downhole with the gamma ray measurement tool 504. The communications unit 540 can include downhole communications in a drilling operation. Such downhole communications can include a telemetry system.

The logging system 500 can also include a bus 527, where the bus 527 provides electrical signal paths among the components of the logging system 500. The bus 527 can include an address bus, a data bus, and a control bus, each independently configured. The bus 527 can also use common conductive lines for providing one or more of address, data, or control, the use of which can be regulated by the controller 525. The bus 527 can include instrumentality for a communication network. The bus 527 can be configured such that the components of the logging system 500 are distributed. Such distribution can be arranged between downhole components such as the gamma ray measurement tool 504 and components that can be disposed on the surface of a well. Alternatively, various of these components can be co-located such as on one or more collars of a drill string or on a wireline structure.

In various embodiments, the logging system 500 includes peripheral devices that can include displays 555, additional storage memory, or other control devices that may operate in conjunction with the controller 525 or the processing unit 106. The display 555 can display diagnostic information for the gamma ray measurement tool 504 based on the signals generated according to embodiments described above.

In an embodiment, the controller 525 can be realized as one or more processors. The display 555 can be arranged to operate with instructions stored in the processing unit 106 (for example in the memory 118 (FIG. 1)) to implement a user interface to manage the operation of the gamma ray measurement tool 504 or components distributed within the logging system 500. Such a user interface can be operated in conjunction with the communications unit 540 and the bus 527. Various components of the logging system 500 can be integrated with the gamma ray measurement tool 504 or associated housing such that processing identical to or similar to the processing schemes discussed with respect to various embodiments herein can be performed downhole.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 118 in the form of read only memory (ROM), random access memory (RAM), a magnetic disk storage device, an optical storage device, a flash memory, and other electronic, magnetic, or optical memory devices, including combinations thereof.

The physical structure of such instructions may be operated on by one or more processors such as, for example, the processing unit 106. Executing these physical structures can cause the machine to perform operations according to methods described herein. The instructions can include instructions to cause the processing unit 106 to store associated data or other data in the memory 118.

Figure 6:
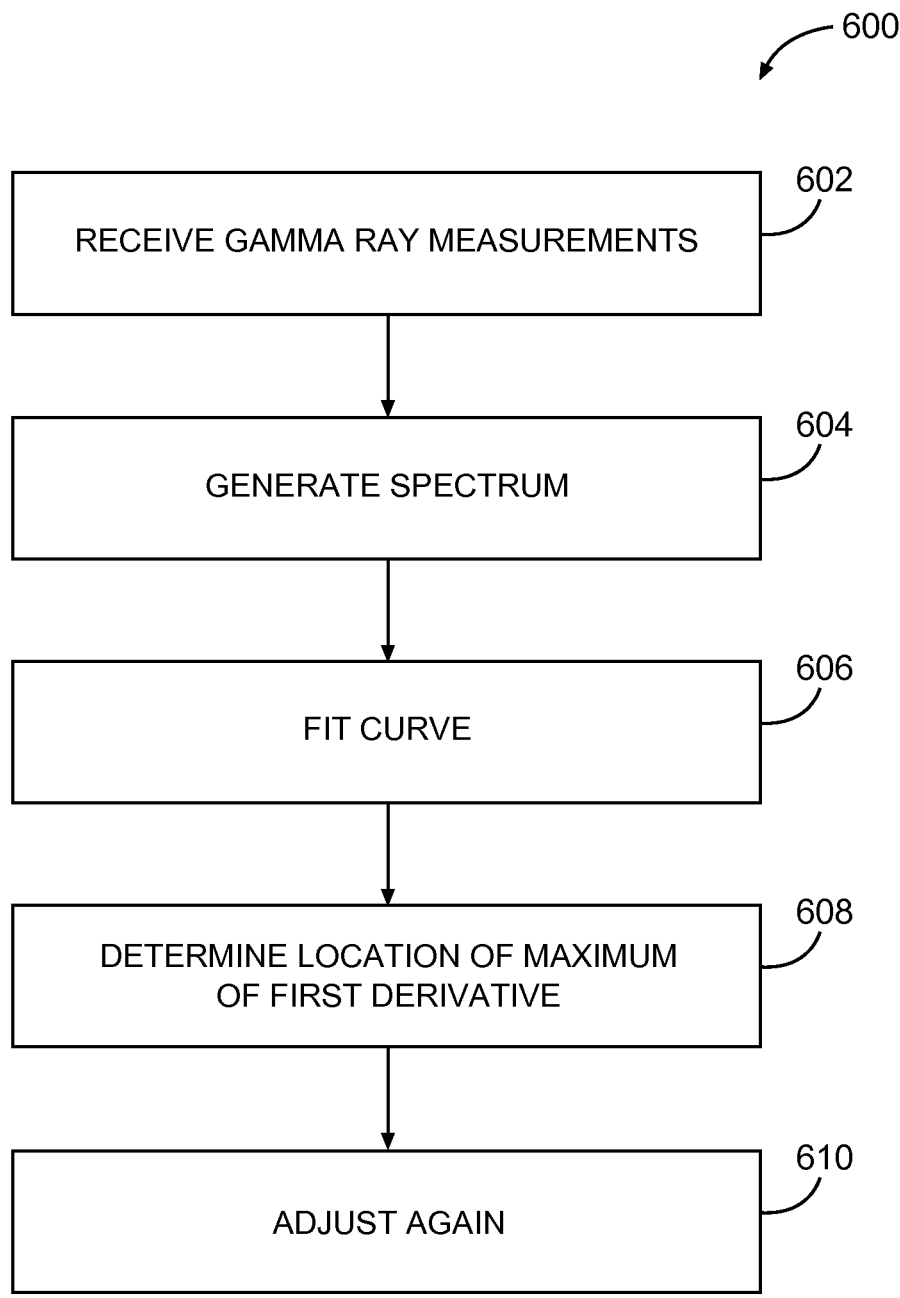
FIG. 6 is a flowchart showing an embodiment of a method for adjusting gain of a gamma ray detector.

FIG. 6 is a flowchart showing an embodiment of a method 600 for adjusting gain of a gamma ray detector 102. The example method 600 is described herein with reference to elements shown in FIGS. 1 and 5. Some operations of example method 600 can be performed in whole or in part by a processing unit(s) 106 and memory 118 (FIG. 1), or any component of system 500 (FIG. 5) or gamma ray measurement tool 100 (FIG. 1), although embodiments are not limited thereto.

The example method 600 begins with operation 602 in which the processing unit 106 receives gamma ray measurements from the gamma ray detector 102.

The example method 600 continues with operation 604 in which the processing unit 106 generates a spectrum based on the gamma ray measurements. The spectrum can be similar to spectra described earlier herein with reference to FIGS. 2 and 3. The spectrum can include several channels with corresponding count rates, wherein a channel number of a channel corresponds to energy values of the received gamma rays.

The example method 600 continues with operation 606 in which the processing unit 106 fits a curve to a portion of the spectrum. The curve can be similar to that described above with reference to at least Equation (2) although embodiments are not limited thereto. For example, an equation to describe the curve can include a cubic polynomial, a fourth-order polynomial, etc.

The example method 600 continues with operation 608 in which the processing unit 106 determines a location of the maximum of the first derivative of the curve that was generated in operation 606. In order to execute operation 608, the processing unit 106 may implement code similar to pseudocode described earlier herein with reference to Table 1, although embodiments are not limited thereto.

The example method 600 continues with operation 610 in which the processing unit 106 adjusting a gain of at least one gamma ray detector 102 based on the location of the maximum of the first derivative of the curve. The processing unit 106 will continue to monitor the location of the maximum of the first derivative of the curve based on gamma ray measurements received subsequent to adjusting the gain. The processing unit 106 may trigger a gain readjustment process to include any or all operations of the example method 600 if the location shifts by more than a threshold amount. The processing unit 106 may perform other operations such as centroid computations or other operations in the event that gross gain adjustments are necessary, as decided periodically, on power up, or according to other criteria as described earlier herein.

Figure 7:
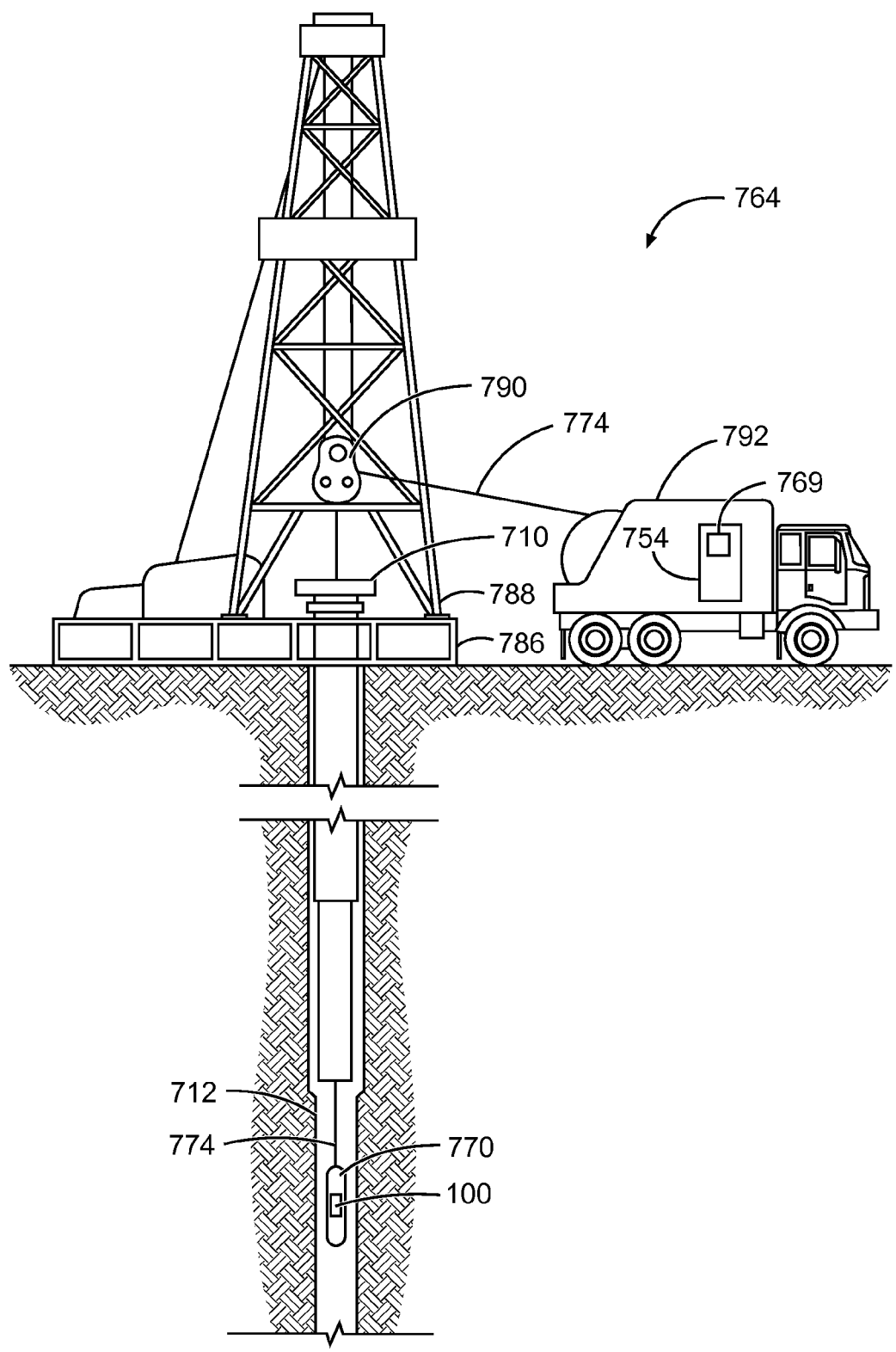
FIG. 7 is a diagram of a wireline system embodiment.
Figure 8:
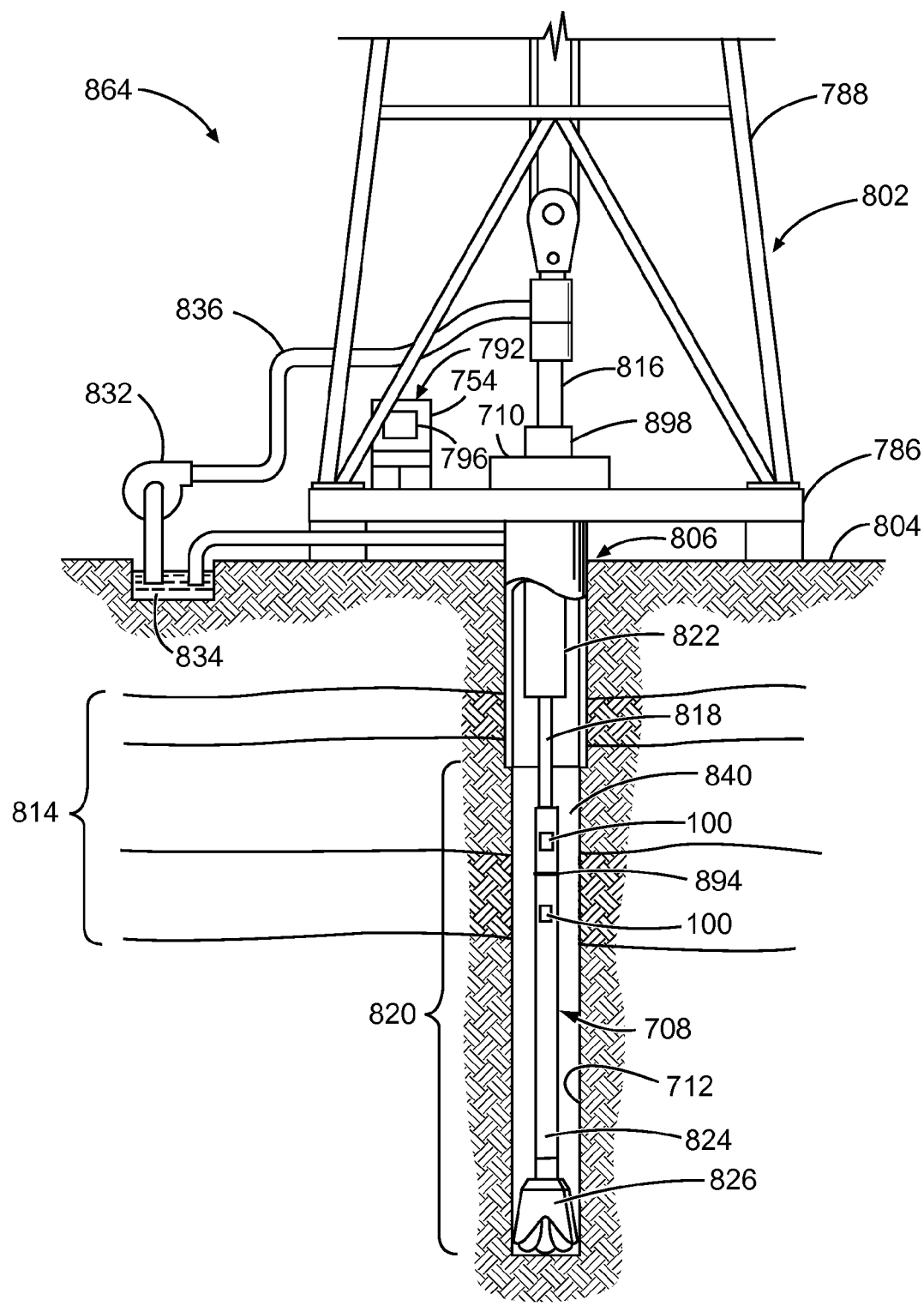
FIG. 8 is a diagram of a drilling rig system embodiment.

As described earlier herein, gamma ray measurement tools can be used in a logging-while-drilling (LWD) assembly or a wireline logging tool. FIG. 7 illustrates a wireline system 764 embodiment of the invention, and FIG. 8 illustrates a drilling rig system 864 embodiment of the invention. Thus, the systems 764, 864 may comprise portions of a wireline logging tool body 770 as part of a wireline logging operation, or of a downhole tool 824 as part of a downhole drilling operation. Thus, FIG. 7 shows a well during wireline logging operations. In this case, a drilling platform 786 is equipped with a derrick 788 that supports a hoist 790.

Drilling oil and gas wells is commonly carried out using a string of drill pipes connected together so as to form a drilling string that is lowered through a rotary table 710 into a wellbore or borehole 712. Here it is assumed that the drilling string has been temporarily removed from the borehole 712 to allow a wireline logging tool body 770, such as a probe or sonde, to be lowered by wireline or logging cable 774 into the borehole 712. Typically, the wireline logging tool body 770 is lowered to the bottom of the region of interest and subsequently pulled upward at a substantially constant speed.

During the upward trip, at a series of depths the instruments (e.g., the gamma ray measurement tool 100 shown in FIG. 1) included in the tool body 770 may be used to perform measurements on the subsurface geological formations adjacent the borehole 712 (and the tool body 770). The measurement data can be communicated to a surface logging facility 792 for storage, processing, and analysis. The logging facility 792 may be provided with electronic equipment for various types of signal processing, which may be implemented by any one or more of the components of the gamma ray measurement tool 100. Similar formation evaluation data may be gathered and analyzed during drilling operations (e.g., during LWD operations, and by extension, sampling while drilling).

In some embodiments, the tool body 770 comprises a gamma ray measurement tool for obtaining and analyzing gamma ray field measurements in a subterranean formation through a borehole 712. The tool is suspended in the wellbore by a wireline cable 774 that connects the tool to a surface control unit (e.g., comprising a workstation 754, which can also include a display). The tool may be deployed in the borehole 712 on coiled tubing, jointed drill pipe, hard wired drill pipe, or any other suitable deployment technique.

Turning now to FIG. 8, it can be seen how a system 864 may also form a portion of a drilling rig 802 located at the surface 804 of a well 806. The drilling rig 802 may provide support for a drill string 708. The drill string 708 may operate to penetrate the rotary table 710 for drilling the borehole 712 through the subsurface formations 814. The drill string 708 may include a Kelly 816, drill pipe 818, and a bottom hole assembly 820, perhaps located at the lower portion of the drill pipe 818.

The bottom hole assembly 820 may include drill collars 822, a downhole tool 824, and a drill bit 826. The drill bit 826 may operate to create the borehole 712 by penetrating the surface 804 and the subsurface formations 814. The downhole tool 824 may comprise any of a number of different types of tools including MWD tools, LWD tools, and others.

During drilling operations, the drill string 708 (perhaps including the Kelly 816, the drill pipe 818, and the bottom hole assembly 820) may be rotated by the rotary table 710. Although not shown, in addition to, or alternatively, the bottom hole assembly 820 may also be rotated by a motor (e.g., a mud motor) that is located downhole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 814.

During drilling operations, a mud pump 832 may pump drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 712. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation cuttings created by operating the drill bit 826.

Thus, it may be seen that in some embodiments, the systems 764, 864 may include a drill collar 822, a downhole tool 824, and/or a wireline logging tool body 770 to house one or more gamma ray measurement tools 100, similar to or identical to the gamma ray measurement tool 100 described above and illustrated in FIG. 1. Components of the system 500 in FIG. 5 may also be housed by the tool 824 or the tool body 770.

Thus, for the purposes of this document, the term "housing" may include any one or more of a drill collar 822, a downhole tool 824, or a wireline logging tool body 770 (all having an outer wall, to enclose or attach to magnetometers, sensors, fluid sampling devices, pressure measurement devices, transmitters, receivers, acquisition and processing logic, and data acquisition systems). The tool 824 may comprise a downhole tool, such as an LWD tool or MWD tool. The wireline tool body 770 may comprise a wireline logging tool, including a probe or sonde, for example, coupled to a logging cable 774. Many embodiments may thus be realized.

Thus, a system 764, 864 may comprise a downhole tool body, such as a wireline logging tool body 770 or a downhole tool 824 (e.g., an LWD or MWD tool body), and one or more gamma ray measurement tools 100 attached to the tool body, the gamma ray measurement tool 100 to be constructed and operated as described previously.

Any of the above components, for example the gamma ray measurement tools 100, processing units 106, etc., may all be characterized as "modules" herein. Such modules may include hardware circuitry, and/or a processor and/or memory circuits, software program modules and objects, and/or firmware, and combinations thereof, as desired by the architect of the gamma ray measurement tool 100 and systems 500, 764, 864 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of gamma ray measurement tool 100 and systems 500, 764, 864 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Some embodiments include a number of methods.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

In summary, using the apparatus, systems, and methods disclosed herein may provide increased stability in the gain of gamma ray measurement tools in the presence of electronics drift, temperature extremes, or other environmental or design factors relative to conventional mechanisms. These advantages can significantly enhance the value of the services provided by an operation/exploration company, while at the same time controlling time-related costs.

Further examples of apparatuses, methods, a means for performing acts, systems or devices include, but are not limited to:

Example 1 is a method for adjusting gain of a gamma ray detector, the method comprising: receiving gamma ray measurements from the gamma ray detector; generating a spectrum based on the gamma ray measurements, the spectrum including a plurality of channels and count rates for the plurality of channels, wherein a channel number of a channel corresponds to energy values of the received gamma rays; fitting a curve to a portion of the spectrum; determining a location of the maximum of the first derivative of the curve; and adjusting a gain of the gamma ray detector based on the location of the maximum of the first derivative of the curve.

Example 2 may include or use, or may optionally be combined with the subject matter of Example 1 can further include wherein the curve is defined by a cubic polynomial.

In Example 3, the subject matter of Examples 1-2 can further include generating a centroid for the spectrum; and fitting the curve to a portion of the spectrum if the centroid is within a threshold distance of a nominal value, and adjusting the gain to generate a revised gain value for the gamma ray detector based on the centroid otherwise.

In Example 4, the subject matter of Example 3 can further include wherein the centroid is generated based on a first subset of the spectrum.

In Example 5, the subject matter of Example 4 can further include wherein the first subset excludes low-energy channels where noise is predicted to be present.

In Example 6, the subject matter of Example 5 can further include wherein, if a difference between the gain and the revised gain value exceeds a threshold, the method further comprises: revising the gain based on a second subset of the spectrum larger than first the subset.

In Example 7, the subject matter of Examples 1-6 can further include monitoring the location of the maximum of the first derivative of the curve based on gamma ray measurements received subsequent to adjusting the gain; and triggering a gain readjustment process if the location shifts by more than a threshold amount.

In Example 8, the subject matter of Example 7 can further include performing a drilling operation based on gamma ray measurements captured subsequent to adjusting the gain.

Example 9 is an apparatus, which can include means for performing any of Examples 1-8, comprising: a gamma ray detector to detect gamma rays reflected from materials in a wellbore; and a processor to receive gamma ray measurements from the gamma ray detector; generate a spectrum of the gamma ray measurements, the spectrum including a plurality of channels corresponding to energy values of the received gamma rays and count rates for the plurality of channels; fit a curve to a portion of the spectrum; determine a location of the maximum of the first derivative of the curve; and adjust a gain of the gamma ray detector based on the location of the maximum of the first derivative of the curve.

In Example 10, the subject matter of Example 9 can further include wherein the processor is further configured to generate a centroid based on a first subset of the spectrum that excludes low-energy channels of the spectrum; and fit the curve to a portion of the spectrum if the centroid is within a threshold distance of a nominal value, and adjust the gain of the gamma ray detector based on the centroid otherwise.

In Example 11, the subject matter of Examples 9-10 can further include an amplifier and a voltage supply unit, and wherein the processor is configured to adjust the gain by adjusting an input to at least one of the amplifier and the voltage supply unit.

In Example 12, the subject matter of Examples 9-11 can further include wherein, if a difference between the gain and a revised gain value exceeds a threshold, the processor is further configured to: revise the gain based on a second subset of the spectrum larger than the first subset.

In Example 13, the subject matter of Examples 10-12 can further include a memory to store the spectrum and data representative of the curve, the gain, and the centroid.

In Example 14, the subject matter of Examples 9-13 can further include wherein the curve is a third order polynomial.

In Example 15, the subject matter of Examples 9-14 can further include wherein the processor is further configured to: monitor the location of the maximum of the first derivative of the curve based on gamma ray measurements received subsequent to adjusting the gain; and trigger a gain readjustment process if the location shifts by more than a threshold amount.

Example 16 is a system, which can include means for performing any of Examples 1-8, comprising: a logging tool, including a housing to house a gamma ray measurement tool, the gamma ray measurement tool including a gamma ray detector for detecting gamma radiation at a plurality of energy levels and for generating detector output signals each representing a detected count of gamma radiation; and a processor to receive gamma ray measurements from the gamma ray detector; generate a spectrum of the gamma ray measurements, the spectrum including a plurality of channels corresponding to energy values of the received gamma rays and count rates for the plurality of channels, fit a curve to a portion of the spectrum, determine a location of the maximum of the first derivative of the curve; and adjust a gain of the gamma ray detector based on the location of the maximum of the first derivative of the curve.

In Example 17, the subject matter of Example 16 can further include communication circuitry to communicate signals from the gamma ray measurement tool; and a surface system to receive the signals from the gamma ray measurement tool over the communication circuitry.

In Example 18, the subject matter of Examples 16-17 can further include a display to display diagnostic information for the gamma ray measurement tool, based on the signals.

In Example 19, the subject matter of Examples 16-18 can further include wherein the processor is configured to fit a third order polynomial curve to the portion of the spectrum.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method for adjusting gain of a gamma ray detector, the method comprising:
   receiving gamma ray measurements from the gamma ray detector; generating a spectrum based on the gamma ray measurements, the spectrum including a plurality of channels and count rates for the plurality of channels, wherein a channel number of a channel corresponds to energy values of the received gamma rays;
   fitting a curve to a portion of the spectrum;
   determining a location of the maximum of the first derivative of the curve; and
   adjusting a gain of the gamma ray detector based on the location of the maximum of the first derivative of the curve.

2. The method of claim 1, wherein the curve is defined by a cubic polynomial.

3. The method of claim 1, further comprising:
   generating a centroid for the spectrum; and
   fitting the curve to a portion of the spectrum if the centroid is within a threshold distance of a nominal value, and adjusting the gain to generate a revised gain value for the gamma ray detector based on the centroid otherwise.

4. The method of claim 3, wherein the centroid is generated based on a first subset of the spectrum.

5. The method of claim 4, wherein the first subset excludes low-energy channels where noise is predicted to be present.

6. The method of claim 5, wherein, if a difference between the gain and the revised gain value exceeds a threshold, the method further comprises:
   revising the gain based on a second subset of the spectrum larger than first the subset.

7. The method of claim 1, further comprising:
   monitoring the location of the maximum of the first derivative of the curve based on gamma ray measurements received subsequent to adjusting the gain; and
   triggering a gain readjustment process if the location shifts by more than a threshold amount.

8. The method of claim 7, further comprising:
   performing a drilling operation based on gamma ray measurements captured subsequent to adjusting the gain.

9. An apparatus comprising:
   a gamma ray detector to detect gamma rays reflected from materials in a wellbore; and
   a processor to
      receive gamma ray measurements from the gamma ray detector;
      generate a spectrum of the gamma ray measurements, the spectrum including a plurality of channels corresponding to energy values of the received gamma rays and count rates for the plurality of channels;
      fit a curve to a portion of the spectrum;
      determine a location of the maximum of the first derivative of the curve; and
      adjust a gain of the gamma ray detector based on the location of the maximum of the first derivative of the curve.

10. The apparatus of claim 9, wherein the processor is further configured to:
    generate a centroid based on a first subset of the spectrum that excludes low-energy channels of the spectrum; and
    fit the curve to a portion of the spectrum if the centroid is within a threshold distance of a nominal value, and adjust the gain of the gamma ray detector based on the centroid otherwise.

11. The apparatus of claim 10, further comprising an amplifier and a voltage supply unit, and wherein the processor is configured to adjust the gain by adjusting an input to at least one of the amplifier and the voltage supply unit.

12. The apparatus of claim 11, wherein, if a difference between the gain and a revised gain value exceeds a threshold, the processor is further configured to:
    revise the gain based on a second subset of the spectrum larger than the first subset.

13. The apparatus of claim 10, further comprising:
    a memory to store the spectrum and data representative of the curve, the gain, and the centroid.

14. The apparatus of claim 13, wherein the curve is a third order polynomial.

15. The apparatus of claim 9, wherein the processor is further configured to:
    monitor the location of the maximum of the first derivative of the curve based on gamma ray measurements received subsequent to adjusting the gain; and
    trigger a gain readjustment process if the location shifts by more than a threshold amount.

16. A system comprising:
    a logging tool, including a housing to house a gamma ray measurement tool,
    the gamma ray measurement tool including
       a gamma ray detector for detecting gamma radiation at a plurality of energy levels and for generating detector output signals each representing a detected count of gamma radiation; and
       a processor to
          receive gamma ray measurements from the gamma ray detector;
          generate a spectrum of the gamma ray measurements, the spectrum including a plurality of channels corresponding to energy values of the received gamma rays and count rates for the plurality of channels;
          fit a curve to a portion of the spectrum;
          determine a location of the maximum of the first derivative of the curve; and
          adjust a gain of the gamma ray detector based on the location of the maximum of the first derivative of the curve.

17. The system of claim 16, further comprising:
    communication circuitry to communicate signals from the gamma ray measurement tool; and
    a surface system to receive the signals from the gamma ray measurement tool over the communication circuitry.

18. The system of claim 16, wherein the surface system further comprises: a display to display diagnostic information for the gamma ray measurement tool, based on the signals.

19. The system of claim 16, wherein the processor is configured to fit a third order polynomial curve to the portion of the spectrum.

* * * * *